C. L. SNYDER.
ABSTRACT OF TITLE AND METHOD OF MAKING THE SAME.
APPLICATION FILED MAY 7, 1919.

1,433,975.

Patented Oct. 31, 1922.

Certificate of Ownership

Abstract Number _____ Motor Number _____
Make of Automobile _____ Type of Body _____
Number of Cylinders _____ Serial or Car Number _____
Year Made _____ License Number _____

This is to certify that _____ of the _____
_____ County of _____ State of _____
is the owner of the Automobile described above. That the said Automobile is free and clear from all incumbrances, except as shown on reverse side of this Certificate

BY PRES. _____
BY SECY. _____

Date of issue _____

---

Sale No. 1.                                   BILL OF SALE

Serial or Car No. _____ Motor No. _____
Abstract No. _____ Year Made _____ Type of Body _____
Know all men by these presents that _____
                                         (Name)              (Address)
city or town of _____ State of _____ Vendor, in consideration of
_____ to _____ paid by _____
                                              (Name)
_____ city or town of _____ State of _____ Vendee,
(Address)
the receipt whereof is hereby acknowledged, do ___grant, bargain, sell and convey unto the said Vendee, _____heirs, successors, administrators, executors and assigns, the automobile described in Automobile Abstract of Title No. _____ which abstract is hereby made a part hereof. To have and to hold the same forever unto the said Vendee, _____ heirs, successors, administrators, executors and assigns, against all claims whatsoever, except as shown on the reverse side of this instrument, which the Vendee hereby does _____ assume.
                                                                                                                (Insert not, if otherwise)
In witness whereof the respective parties hereto have hereunto set their hands and seals this _____ day of _____ A.D. 19___
Witness:

_____     _____(L. S.)

_____     _____(L. S.)

County of _____ }              The above subscribed severally, being duly sworn before me this _____
State of _____ } ss.    day of _____ A.D. 19___, depose and say that _____
                                                                                                      (See * below)
Notary's       _____ respectively, that the statements
Impression     made in the above instrument are true and that said instrument was executed in good faith, and that same is their free
Seal.          act and deed.

My commission expires _____     Notary Public County of _____ State of _____
(*Insert they are the vendor and vendee, or vendor and agent of the vendee, or agent of the vendor and vendee, as the case may be)

---

Sale No. 2.                                   BILL OF SALE

Serial or Car No. _____ Motor No. _____
Abstract No. _____ Year Made _____ Type of Body _____
Know all men by these presents that _____
                                         (Name)              (Address)
city or town of _____ State of _____ Vendor, in consideration of
_____ to _____ paid by _____
                                              (Name)
_____ city or town of _____ State of _____ Vendee,
(Address)
the receipt whereof is hereby acknowledged, do ___grant, bargain, sell and convey unto the said Vendee, _____heirs, successors, administrators, executors and assigns, the automobile described in Automobile Abstract of Title No. _____ which abstract is hereby made a part hereof. To have and to hold the same forever unto the said Vendee, _____ heirs, successors, administrators, executors and assigns, against all claims whatsoever, except as shown on the reverse side of this instrument, which the Vendee hereby does _____ assume.
                                                                                                                (Insert not, if otherwise)
In witness whereof the respective parties hereto have hereunto set their hands and seals this _____ day of _____ A.D. 19___
Witness:

_____     _____(L. S.)

_____     _____(L. S.)

County of _____ }              The above subscribed severally, being duly sworn before me this _____
State of _____ } ss.    day of _____ A.D. 19___, depose and say that _____
                                                                                                      (See * below)
Notary's       _____ respectively, that the statements
Impression     made in the above instrument are true and that said instrument was executed in good faith, and that same is their free
Seal.          act and deed.

My commission expires _____     Notary Public County of _____ State of _____
(*Insert they are the vendor and vendee, or vendor and agent of the vendee, or agent of the vendor and vendee, as the case may be)

*Fig. 1.*     by _____ Atty's

Inventor
Cecil L. Snyder

C. L. SNYDER.
ABSTRACT OF TITLE AND METHOD OF MAKING THE SAME.
APPLICATION FILED MAY 7, 1919.

1,433,975.

Patented Oct. 31, 1922.

| Date Executed | Kind of Instrument, Mortgage or Contract, state which | Name of Mortgagee or Vendor | Amount | Where Recorded | Discharge of Mortgage Recorded |
|---|---|---|---|---|---|
| | | | | | |

| Date Executed | Kind of Instrument, Mortgage or Contract, state which | Name of Mortgagee or Vendor | Amount | Where Recorded | Discharge of Mortgage Recorded |
|---|---|---|---|---|---|
| | | | | | |

| Date Executed | Kind of Instrument, Mortgage or Contract, state which | Name of Mortgagee or Vendor | Amount | Where Recorded | Discharge of Mortgage Recorded |
|---|---|---|---|---|---|
| 9 | 10 | 11 | 12 | 13 | 14 |

Fig. 2.

by *Atty's*

Inventor
Cecil L. Snyder.

Fig. 3.

Inventor
Cecil L. Snyder,
by
Atty's

C. L. SNYDER.
ABSTRACT OF TITLE AND METHOD OF MAKING THE SAME.
APPLICATION FILED MAY 7, 1919.

1,433,975.

Patented Oct. 31, 1922.

APPLICATION for
Automobile Abstract of Title

Applicant's Name_____ Address_____
                                                                                              Number                Street Town or City_____County of_____State of_____

Trade Name_____Year Made_____Type of Body_____

Motor Number_____Serial or Car Number_____

Number of Cylinders_____Manufactured by_____

Date of Purchase_____Did You buy it New or Second Hand?_____

Purchase Price ($_____) Is it Insured?_____ If so, by Whom?_____

Are You Buying it on Contract?_____If so, State Whether or Not a Conditional Contract_____

Is it Mortgaged?_____If so, to Whom?_____

How Much?_____($_____) Date Mortgage Was Recorded_____

Where Recorded?_____

Are You a Dealer in Automobiles?_____Are You a Manufacturer's Agent?_____

If so, of Whom?_____

Are You a Licensed Agent or Dealer?_____

Vendor's Name_____Address_____

Town or City_____County of_____State of_____

Is Vendor a Dealer in Automobiles?_____Is Vendor a Manufacturer's Agent?_____

If so, of Whom?_____Is Vendor a Licensed Agent or Dealer?_____

This Year's License Number_____Issued by State of_____

Last Year's License Number_____Issued by State of_____

Applicant's Signature

NOTICE—The Notary is requested to see that all spaces in the above application are properly filled in, and that his seal is affixed in space allotted for the same.

State of_____ }
County of_____ } ss.

On this_____day of_____A. D. 19____personally appeared before me_____
who being first sworn, deposes and says that_____the applicant named in the above mentioned
                                            (insert he is or is agent for)
application and that he has signed the same and that the matters therein stated are true to the best of his knowledge and belief.

Notary Public in and for said County and State

My Commission Expires_____A.D. 19____

Notary's
Impression Seal

Upon receipt of Two Dollars ($2.00) and this Application an Abstract will be issued

Automobile Abstract and Title Company
Detroit, Michigan, U. S. A.

See Reverse Side for Instructions.

Fig. 4.

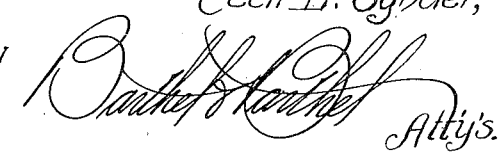

Inventor
Cecil L. Snyder,
by
Atty's.

Patented Oct. 31, 1922.

1,433,975

UNITED STATES PATENT OFFICE.

CECIL L. SNYDER, OF DETROIT, MICHIGAN.

ABSTRACT OF TITLE AND METHOD OF MAKING THE SAME.

Application filed May 7, 1919. Serial No. 295,297.

*To all whom it may concern:*

Be it known that I, CECIL L. SNYDER, a citizen of the United States of America, residing at Detroit, in the county of Wayne and State of Michigan, have invented certain new and useful Improvements in Abstract of Titles and Methods of Making the Same, of which the following is a specification, reference being had therein to the accompanying drawings.

My invention aims to provide a structural abstract of title and a method of carrying the abstract into effect so that it becomes a constant and positive weapon against theft, misconveyance, and surreptitious use of property, particularly an automobile or similar vehicle.

Briefly described, an automobile abstract of title is in the form of a book adapted to be issued to the owner of an automobile and used for the life of the car. The book includes a constructive arrangement of forms, some of which are in duplicate, and the most important of which is the bill of sale. Upon the purchase of a new automobile from the manufacturer's distributer, or upon the purchase of a used or secondhand automobile from an owner the bill of sale is made out by a notary public and sworn to. A duplicate of the bill of sale is also prepared by the notary and forwarded to the party issuing the abstract of title book. Triplicates of such bill of sale may be forwarded to the Secretary of State, State motor vehicle department, police department, or any places where a record of an automobile may be advantageously maintained.

Besides the bill of sale or certificate of ownership, there are special forms for additional sales or transactions and a similar record is adapted to be maintained so that throughout the life of an automobile there will be a complete history or summary arranged in chronological order, showing the origin, title, encumbrances, liens and liabilities to which an automobile may be subjected. Further carrying this into effect, there are pages in the book providing forms, records of any mortgage, contract or lien instrument, and other pages are devoted to forms constituting notices and the recording of any mortgage, contract or lien instrument. With such a structural arrangement of forms and by carrying out a method in accordance with my invention, it is possible to guarantee and prove the title of an automobile upon demand; to prevent any one selling or purchasing a stolen automobile; to afford protection and assist in obtaining loans and loaning money on automobiles; to prevent many court suits that otherwise follows sales transactions; to aid insurance companies and prevent an automobile thief or dishonest abstract holder from making fraudulent claims; to reduce theft hazards for insurance companies and consequently reduce insurance rates, and, to aid and assist State license bureaus and police departments.

My invention and the method of carrying it into effect will be hereinafter more fully considered, and reference will now be had to the drawings, wherein Figure 1 is a plan view of one of the pages of a book form embodying features of my invention;

Fig. 2 is a similar view of the reverse face of the page;

Fig. 3 is a similar view of another page of the book form, and

Fig. 4 is a similar view of still another page that may be included in the book form.

The book form, mentioned in the beginning, comprises a suitable cover or folder in which the leaves or pages may be suitably bound, it being preferable to bind the upper ends of the leaves or pages in the upper folded portion of the cover so that the book is somewhat of manuscript form capable of being folded in a documentary manner.

The first page in the book form, as illustrated in Fig. 1, is adapted to have its upper end or edge 1 held by staples, stitchings or other binding means, and the right hand edge of the page is formed integral with a duplicate page 2 adapted to be folded on the weakened or perforated tearing line 3 into parallel registration with the bound end of the page. Page 2 is practically a duplicate of the bound in page and considering the main page, which is a permanent record for the owner of an automobile, the page is divided into three portions 4, 5 and 6 by transverse lines, and these same transverse lines are carried onto page 2 as perforated lines so that portions of the duplicate page 2 may be separated and used for specific purposes, as will hereinafter appear.

On the portion 4 of the main page, as shown in Fig. 1, is printed, engraved or otherwise provided with an oblong somewhat ornamental border 7 for a certificate of ownership and the title of this portion of the page is in large type while the remaining portion of the certificate is in small type and adapted to set forth the abstract number; make of the automobile; number of cylinders; year made; motor number; type of body; serial or car number; and license number. This indicia occupies about four lines in the upper part of the border and it is preferable to place the indicia in two columns. The lower portion of the certificate at the lower left hand corner thereof has a space 8 for a seal, and the remaining lower portion certifies as to the ownership of the automobile, the same being certified to by officers of the company, firm or corporation issuing the abstract of title. There is a place for a date and at the time of making out this certificate of ownership the duplicate on page 2 is also filled in so that it will correspond to the original certificate of ownership.

The portions 5 and 6 of the page are identical, with the exception, of bearing serial numbers or being consecutively numbered, each portion having a title "Bill of sale" and including sufficient indicia in order that all right, title and interest in the automobile identified by the certificate of ownership may be transferred to another party, the owner of the automobile being designated the vendor, and the buyer as the vendee.

The bill of sale is of legal form, including a jurat and there are sufficient blank spaces for all of the data necessary to complete the sale of the automobile.

As there may be numerous transfers of the ownership of the automobile, a number of the pages in the book may be devoted to bills of sale, with all of the forms serially or consecutively numbered. The first pages containing the bills of sale are also in duplicate, similar to the first page, so that copies of the bills of sale may be removed and recorded. For this and other purposes the back of the first page, as well as other pages, containing bills of sale are provided with spaces of column formation, as shown in Fig. 2, which represents the reverse face of the first page of the book, as shown in Fig. 1. There is a column 9 for the date of execution in connection with the bill of sale; a column 10 to indicate the kind of instrument, mortgage or contract used in the transaction; a column 11 for the names of mortgagee or vendor; a column 12 for the amount involved; a column 14 for data as to where the instrument is recorded, and a column 14 for data relative to the discharge of the mortgage recorded. The columns extend from the upper edge to the lower edge of the page, but are sub-divided by appropriate titles, so that the back of each original or duplicate bill of sale will contain a résumé of the main facts of the sale.

Figure 3:
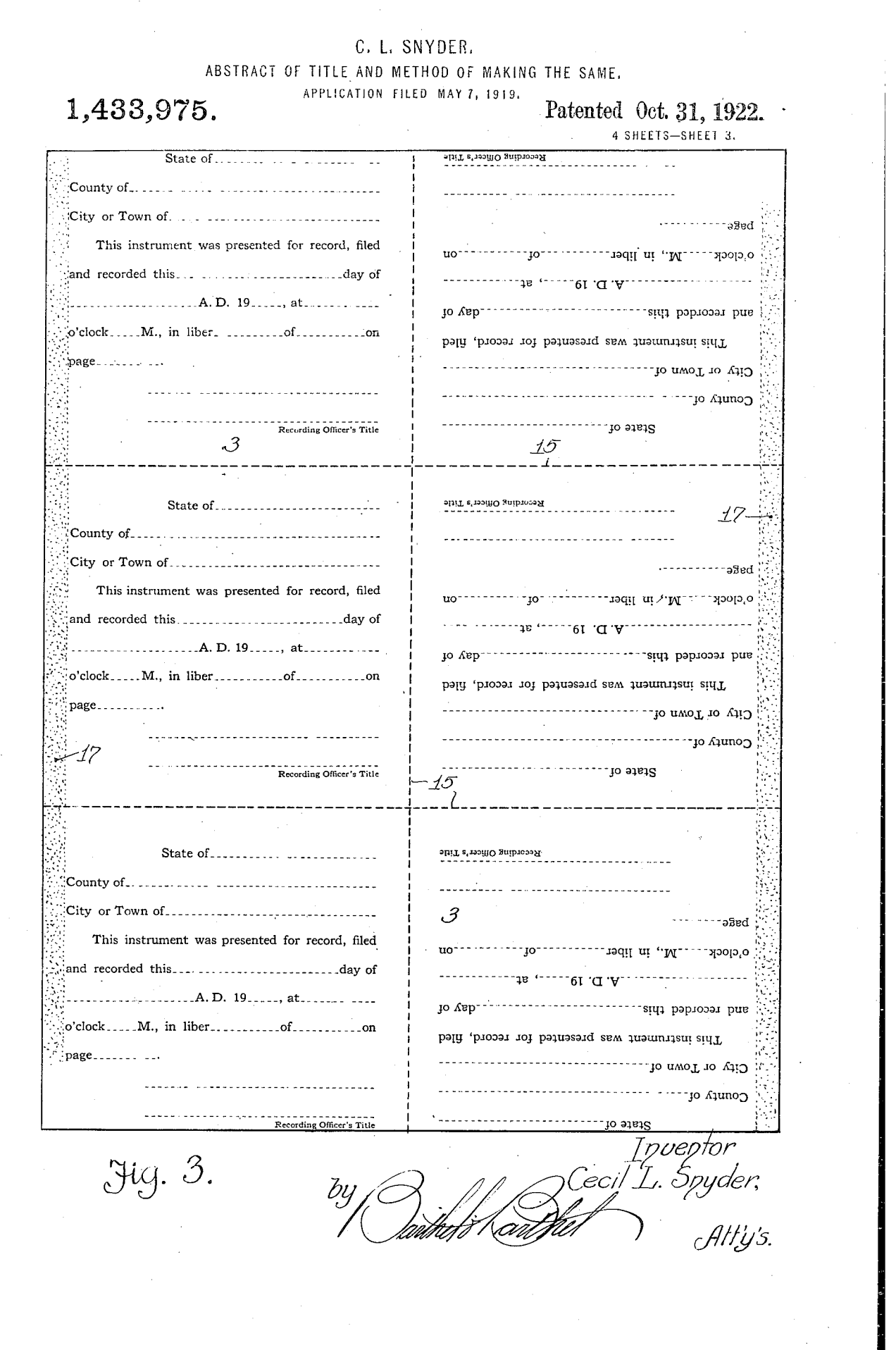

Other pages in the book, one of which is shown in Fig. 3, are devoted to blank forms adapted to be filled in by a recording officer, detached by the weakened or perforated tearing line, indicated 15, and pasted or otherwise permanently attached to each original bill of sale. For this purpose, there is a space 16 at the left hand side of each bill of sale entitled, "Paste register certificate here" and in order that the recording memorandum may be readily attached to each original bill of sale, each memorandum has a gummed or adhesive coated surface 17.

The memoranda for the bill of sale record is preferably in two columns with the memoranda of one column upside down compared to the other and this permits of the side edges of the page being gummed or adhesively coated on the reverse side of the page, so that gummed or adhesively coated portions of each memorandum will be at the left hand side thereof, and permits of the record being attached to a bill of sale without interfering with the reading of any matter on the bill of sale. Each bill of sale record includes sufficient space for the State, county, city or town in which the bill of sale is presented for record; the day of the month, year and time of the day of recording, and the liber and page of record, together with suitable spaces for the recorder's name and official title.

The book may or may not include an application form which has been shown in Fig. 4, and if within the book a whole page is devoted to the same and numerous questions are asked so that there will be a historical record of the automobile on the application form and from which a certificate of ownership or bill of sale may be prepared. The application form includes spaces for answers to various questions, and there is a notary's jurat so that the applicant may swear to or affirm all the statements in the application.

With abstract books embodying the data, indicia and structural features set forth above, it is possible for a company, corporation or individual to furnish the abstract books to manufacturers so that an abstract of title may accompany each car sold by the manufacturer direct to the user. Then again, it is possible for the company issuing the abstract book to furnish the same to automobile distributors or upon receipt of an application blank, duly executed, to furnish the owner of an automobile with an abstract of title. Assuming that the company which issues the abstract book maintains a complete record of the production of each automobile company, that is, motor numbers, types of bodies, car numbers etc., it is possible for the company to verify any certificate of ownership when the owner of the car presents a duplicate or copy of the certificate of ownership and this verification is only necessary when there is a dispute as to ownership or a bill of sale in connection with the automobile.

Assuming that the owner of an automobile desires to sell his car and that a buyer has been found for the same, then the first bill of sale within the automobile owner's abstract book is properly made out in the original and also in the duplicate and these bills of sale are acknowledged before a notary public or justice of the peace having an official seal, the duplicate bill of sale is detached and together with a copy of the original certificate of ownership which may also be removed from the book, are forwarded to the abstract company for verification and reference. The buyer of the automobile not only retains the original copy of the bill of sale, but has the original certificate of ownership, and both of these records may be proven by the records of the company issuing the abstract. Furthermore, the buyer of the automobile may have a bill of sale recorded before proper city, county, or State officials, and a memorandum of the recorded bill of sale may be attached to the original bill of sale. The buyer of the automobile therefore has an ironclad record of the bill of sale, and should he desire to dispose of the automobile, this procedure is carried through to the purchaser and in each and every instance the abstract company receives a record of the transaction. A purchaser may therefore call for a record of any particular machine to ascertain if the title is clear from the manufacturer to purchaser and should the record not be clear either with the owner of the car or with the company, then the purchaser knows that in all probability there has been a fraudulent transaction at some time during the life of the car. However, with this abstract system universally adopted it would be impossible to dispose of a stolen car unless the car is accompanied by an abstract of ownership and a complete record. Should a thief attempt to dispose of a stolen car, the intending purchaser can send a record of the car to the abstract company, who will advise the purchaser regarding the car and in this manner the company be informed of cars on which numbers, etc., may have been changed. Therefore it is possible to detect any fraudulent practice in connection with a car record. It is practically impossible for a thief to disfigure a car, alter and change the original car numbers and by so doing dispose of the stolen automobile. A forged abstract can also be detected, and throughout the system it is possible for State license and police bureaus to check a car that may be impounded or discovered without an owner.

From the above description, when taken in connection with the disclosure of the drawings, it will be seen that the abstract, while issued by and guaranteed by an issuing agency—the issuing company—is itself in the form of the actual and original transfer mediums—the original bills of sale—successive transfers being found on successive blanks of the abstract. These transfer records are not produced by the issuing agency, but by the parties to the transfer, the guarantee of the issuing agency being provided by the deposit with the agency of a duplicate of the particular transfer when such transfer is made, the abstract itself being the medium through which the transfer is made.

This system is made possible by the use of the blanks shown in the drawings and the particular arrangement of the blanks. For instance, the blanks 5 and 6 shown in Fig. 1, are blanks constituting bona fide bills of sale, when completed, thus having transfer characteristic, the blanks being duplicates with the exception of the identifying indicia of the blanks—as distinguished from the identifying indicia of the property being transferred—the identifying indicia providing a predetermined succession or sequence in the use of the blanks for transfer purposes. Hence, these blanks provide the complete transfer record when filled in or completed, and remain a permanent portion of the abstract.

The page indicated as 2 is an exact duplicate of page 1 with respect to the indicia thereof and the arrangement of the blanks, the identifying indicia corresponding to that of the corresponding blanks of page 1, the blanks of corresponding indicia being positioned side by side, weakened line 3 separating the originals from the duplicates; and whereas the blanks of the originals are permanently connected, those of the duplicates are connected by the weakened lines between successive blanks.

When, therefore, blank 4, which constitutes the original evidence of ownership of the property, and its complemental duplicate, are completely filled out, and the duplicate deposited with the issuing agency, the beginning of the abstract is had, the original being in the possession of the owner of the property, and the duplicate in the hands of the agency which, through its agent, has given its certificate of ownership and therefore its guarantee.

When the first transfer is made, blank 5 is completed, as is its complemental duplicate; the latter is detached and deposited with the issuing agency, remaining a permanent record of the agency, while the original remains in the hands of the purchaser. Should the duplicate not be deposited, any inquiry made of the agency relative to the property will show the last duplicate record made, and since this would not include that of the transfer, the proposed purchaser would be placed on his guard. If the duplicate still remained attached, the reason for the report of the agency would be apparent; if unattached, warning would be given to the purchaser through the report made. And if a second transfer be indicated, by both original blanks 5 and 6 being filled out, inquiry by the proposed purchaser would demonstrate any flaw in the records, since the absence of the regular sequence of duplicates, would indicate possible fraud, as would the receipt, for instance of the duplicate of the transfer of blank 6 by the issuing agency when the records of the agency failed to disclose the duplicate of blank 5, in which case the agency would serve notice on the purchaser of the flaw in the title.

And to the purchaser, the absence of the duplicate corresponding to that of the original by which he receives his title, would provide indication of possible fraud, the relative positions of the duplicates to the originals, and the complemental identifying indicia, providing a check in this respect.

And in the carrying forward of the various transactions, it will be understood that one of the two parties to each transaction is vitally interested in having the record of the transaction made of record at the agency. If the transaction is an actual transfer, the purchaser is the interested party, since it involves the lodging of the complete title in his name. If the transfer is a lien of some kind, the one applying the lien is vitally interested; for instance, the mortgagee is obviously interested in having his lien made of record at the issuing agency in order that clear title cannot be passed until his lien is satisfied. And in this the blanks shown in Fig. 2 are of importance. These blanks are individual to the blanks shown in Fig. 1, and each is designed to carry the record of the liens, etc., provided during the period when the property is in the possession of the person whose name is found as the owner on the corresponding blank of Fig. 1. And as each lien or transaction is had, the party vitally interested, informs the agency of the character of the transaction, the agency then providing the proper record on the corresponding duplicate which is in its possession, this same action being taken when the lien is satisfied, the owner of the property then being the party interested.

It is because of the fact that the original blanks of the abstract are the actual and original transfer and transaction evidence that it is possible for the issuing agency to provide its guarantee, since this necessitates the presentation of the original abstract to the party vitally interested, and his interests are such as to practically compel notification through the duplicates or separate notification to the agency of the particular transaction in question, making it possible for the issuing agency to guarantee its abstract, although the original abstract may never be deposited until the final disposition of the property calls for the return of the original to the agency. And the safeguards provided by the arrangement of the original and duplicate blanks aid in this, in that they produce a check both to the agency and the person vitally interested.

My invention is not necessarily limited to the book form, as the first page and its adjoining duplicate may answer the purpose in numerous instances, and for this reason I do not care to confine my invention other than limited by the appended claims.

What I claim is:—

1. A motor vehicle title disclosing record consisting of a book having a plurality of sets of leaves, one leaf of each set being permanently secured in the book and the other or others being detachably secured therein, each leaf of each set having like identifying data comprising a dating space and identical and appropriately designated spaces for indicating the kind of motor vehicle, the number thereof and other identifying data relating to the vehicle, each sheet of each set also having identical and appropriately designated spaces for the signature of the seller, purchaser, witnesses to said signatures and notary public; the book with its permanently attached and properly inscribed leaves constituting a complete record of title to the vehicle and being transferable therewith, and the said detachable leaf or leaves bearing inscriptions identical with those of the book adapted to be separated from the latter and filed in appropriate places.

2. A record as in claim 1 characterized in that the book also carries a certificate of ownership having identifying data of the car, said certificate being positioned to form the initial entry in the chain of title disclosed by the record.

3. A record as in claim 1 characterized in that the several leaves have spaces to receive record data of lien characteristic.

In testimony whereof I affix my signature in the presence of two witnesses.

CECIL L. SNYDER.

Witnesses:
ANNA M. DORR,
OTTO F. BARTHEL.